Figure 1:
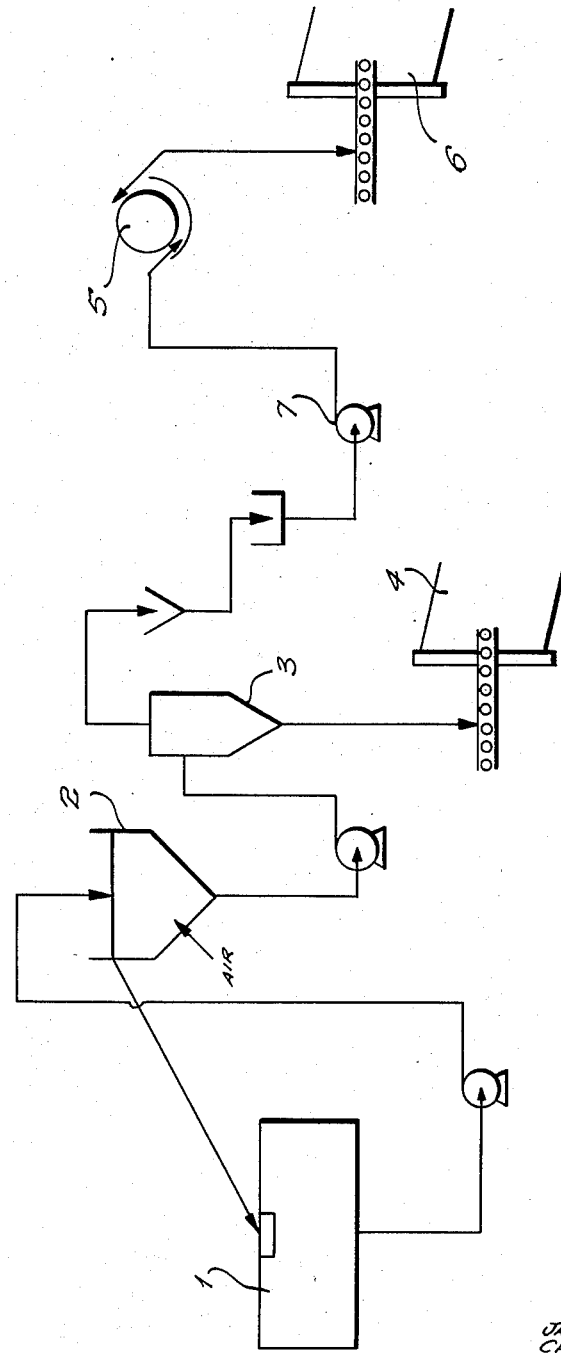

INVENTORS
JAMES ALLEN ROBERTSON
CHARLES BURKE MILES
DONALD CROUCH LINTON
BY Pollard & Johnston
ATTORNEYS

United States Patent Office 2,703,273
Patented Mar. 1, 1955

2,703,273

METHOD OF PRODUCING MAGNESIA PRODUCTS FROM MAGNESIUM HYDROXIDE SLUDGE

James Allen Robertson, Newark, Charles Burke Miles, Redwood City, and Donald Crouch Linton, Palo Alto, Calif., assignors to Food Machinery and Chemical Corporation, New York, N. Y., a corporation of Delaware Application July 3, 1951, Serial No. 235,034

5 Claims. (Cl. 23—201)

This invention relates to new and useful magnesia products and methods of producing the same. It may be considered an improvement on the process described in the patent to M. A. Mastin, No. 2,124,002, granted July 19, 1938, and is applicable to magnesium hydroxide sludges precipitated from solutions containing magnesium salts more particularly described in said patent.

Since the beginning of the commercial manufacture of magnesia products from sea water or sea water bitterns, the production of commercial magnesias corresponding as nearly as possible to those previously produced from the calcination of magnesite has been a problem of the industry. For example, calcined magnesia of a given chemical activity produced from sea water or bittern does not usually correspond in bulk density to the magnesias produced by the calcination of magnesite and when used for oxychloride cement these magnesias require a high ratio of aqueous solution of magnesium chloride or magnesium sulfate to the magnesium oxide to properly gauge the mix and, when mixed, the oxychloride cement has an excessive non-plastic shrinkage far above the accepted specifications for oxychloride cement and a strength significantly lower than oxychloride cement prepared from calcined magnesite.

Likewise magnesia produced from sea water or bittern when used for the production of commercial refractories does not contain the fluxing agents, which are found in mined magnesite, in quantities which permit the production of dense refractories in a rotary kiln and these fluxing agents must be supplied from other sources to produce satisfactory magnesia refractories from sea water or bittern. When, however, magnesium hydroxide is precipitated from sea water or bittern by the process of the said Mastin patent some of the fluxing agents necessary for the production of commercial refractories are introduced into the material but these constitute undesirable impurities if the magnesium hydroxide precipitated in this manner is used for the production of chemical grades of magnesia.

Nevertheless, the use of lime or dolomitic lime to precipitate magnesium hydroxide from sea water or bittern according to the said Mastin patent, No. 2,124,002, gives certain advantages and it is one of the objects of this invention to permit the use of lime or dolomitic lime as the precipitating agent and overcome some of the disadvantages of such use by separating the hydroxide sludge into two or more fractions and concentrating the said impurities largely into the coarser fraction while producing a fine fraction which is sufficiently free of impurities to permit the manufacture of chemical grades of magnesia therefrom.

Another object of this invention is to produce refractory, chemical, and oxychloride grades of magnesia from magnesium hydroxide precipitated from bittern or sea water which will more nearly correspond to similar types of magnesia produced by the calcination of magnesite.

Another object of the invention is to produce magnesia of a higher purity from magnesium hydroxide precipitated from sea water or bittern than has been economically possible by prior known methods.

Another object of the invention is to provide refractory and chemical grades of magnesia produced from magnesium hydroxide precipitated from sea water or bittern which will be lower in calcium and silicon content than previous magnesium oxides produced from sea water or bittern.

Another object of the invention is to provide an oxychloride grade of magnesia from bittern or sea water which is free from excessive contraction, has a low gauging ratio with reference to aqueous magnesium chloride or magnesium sulfate gauging solutions and has substantially the same contraction and strength as oxychloride grade magnesia produced by the calcination of magnesite.

Another object of the invention is to provide a process in which magnesium hydroxide precipitated from sea water or bittern may be economically separated into two or more fractions which fractions may be processed to provide different types of magnesia. In some instances the magnesium hydroxide sludge from each fraction may be sold and used without calcination.

Various other objects and advantages of our invention will become apparent as this description proceeds.

The bitterns herein referred to are generally mother liquors left after evaporation of sea water or brines for the recovery of common salt therefrom, but any aqueous solution containing economically recoverable quantities of magnesium ions may be used. These solutions usually contain residual sodium chloride and more or less magnesium as chloride or sulfate or as both. Other saline compounds, not here important, are usually present in less amounts.

The process of this invention is applicable to magnesium hydroxide sludges precipitated from any suitable solution containing a soluble magnesium halide, usually the chloride and usually though not necessarily other salts such as calcium and sodium chlorides, irrespective of its origin and whether or not it is a true bittern.

In the production of magnesium hydroxide from bittern, sea water or other brines for calcination to various grades of magnesias, it is customary to precipitate magnesium hydroxide from the bittern or sea water by the use of quicklime or dolomitic materials, as described, for example, in the said Mastin patent, No. 2,124,002.

In the use of quicklime or dolomitic materials (dolime) for the precipitation of magnesium hydroxide sludges, certain impurities are introduced into the magnesium hydroxide and it is one of the objects of this invention to separate such impurities such as lime and silica very largely into one fraction of the magnesium hydroxide produced according to the Mastin patent and use this fraction for the production of oxychloride and other grades of magnesia where a higher lime and silica content is not objectionable or may be advantageous and to use the second fraction, which has the lesser content of CaO and $SiO_2$, for the production of premium or superior grades of magnesia, such as chemical grades, refractory insulation grades, and the like.

One of the advantages of our process is that dolomitic or lime materials having a fairly large silica content may be calcined to produce dolomitic lime for use as a precipitating agent for the bittern or sea water and the high silica content of the magnesium hydroxide sludge economically concentrated into one fraction of the precipitate while the other fraction of the precipitate may be kept relatively low in silica. The two precipitates may then be calcined to produce different magnesia products. In this way poorer grades of dolomitic limestone may be used without penalizing the quality of the product.

We have found that if the magnesium hydroxide slurry, produced for example by precipitation from bittern or brine by the use of dolomitic lime according to the Mastin patent, No. 2,124,002, is separated into two or more fractions prior to calcination of the magnesium hydroxide to produce the various grades of magnesia, the greater amount of calcium oxide and silica will be segregated into the fraction of the coarser particle sizes, also upon calcination that this fraction will have a higher bulk density in pounds per cubic foot than magnesium oxide produced by similar calcination of the entire hydrated magnesia slurry produced by the Mastin process and that this calcined fraction may be used to produce a superior grade of oxychloride cement where the higher silica and lime content is not objectionable. When this coarse sludge is calcined to produce commercial periclase refractories, the greater concentration of calcium oxide and silica therein provides some of the necessary fluxing agents which are otherwise missing from sea water magnesia.

We have also found that the fine fraction separated from the magnesium hydroxide slurry prior to calcination will have, after calcination, a lower bulk density, probably indicative of a smaller particle size and larger available surface area, and a lower calcium and silicon content than magnesias produced by calcination of the whole hydrated magnesia slurry under similar conditions and that it may be calcined to produce premium grades of chemical, adsorptive and refractory magnesias.

While any suitable method of separating the slurry into a coarse and a fine fraction may be used, such as shaking or vibrating screens, centrifugal separators and other means suitable for wet classification of solids into various particle sizes, we have found that a wet cyclone separator such as described, for example, in the article entitled "Clycone operating factors and capacities on coal and refuse slurries," by D. A. Dahlstrom, American Institute of Mining Engineers, Mining Transactions, vol. 184, pages 331 to 344, September 1949, will provide an efficient and economical classification which is readily adaptable for use in our process.

Figure 2:
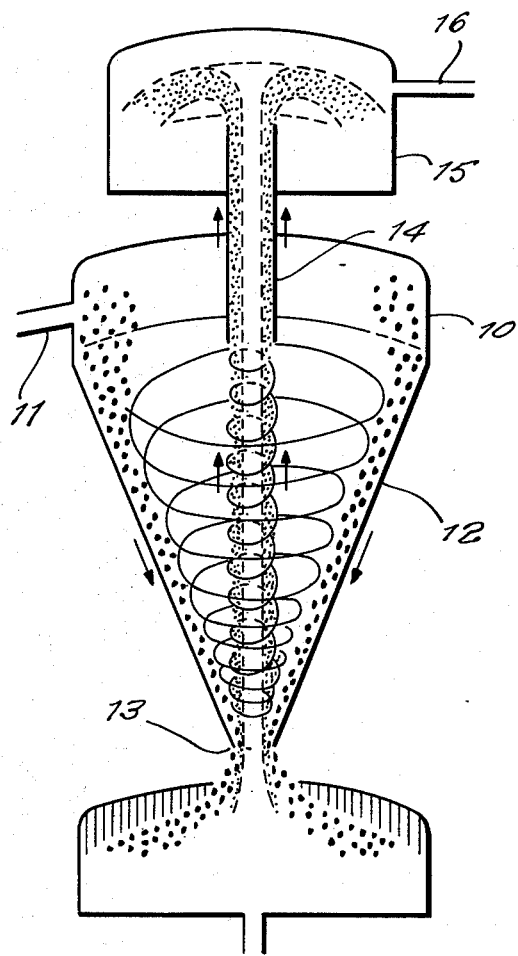

Referring now to the drawings which indicate a preferred form of embodiment of our invention, Fig. 1 is a diagrammatic flow sheet illustrating one method of practicing our process and Fig. 2 is a diagrammatic illustration of a cyclonic wet classification separator.

As illustrated in Fig. 1, a tank for holding the hydrated magnesia slurry produced, for example, by the precipitation of magnesium hydroxide from bittern by the use of dolomitic lime in accordance with the said Mastin patent, No. 2,124,002, is indicated at 1. From the tank 1 the slurry or sludge is pumped preferably by a diaphragm pump to a vessel 2 wherein the magnesium hydroxide sludge may be kept in uniform suspension by blowing air therethrough. The overflow from tank 2 is returned to the tank 1 and from the bottom of the tank 2 a stream of sludge is fed to a centrifugal, a vibratory screen, a wet cyclonic separator or other type of separator indicated at 3 wherein it is separated into a fine and a coarse fraction. Preferably the separator 3 is a wet cyclonic separator of the type described in the above noted article.

While the separator 3 may be controlled to any desired degree to separate the slurry into fine, coarse and if desired intermediate particle size fractions, we prefer to separate the whole slurry into a coarse particle size fraction constituting 30 to 40% of the whole slurry and a fine particle size fraction constituting 60 to 70% of the whole slurry based upon the magnesium hydroxide content of the slurry. The coarse fraction is then passed to kiln 4 for calcination to magnesium oxide and the fine fraction, usually containing a large amount of water, is preferably passed by a pump 7 to a filter 5 and from the filter 5 to a kiln 6 for calcination to magnesium oxide. It will be obvious that a filter may also be used for filtering the coarse material prior to its passage into the kiln 4 or that the use of a filter 5 prior to the kiln 6 may be omitted if the economic penalty of the evaporation of excess water in the kiln 6 is not too great. The coarse fraction from a wet cyclonic separator usually contains sufficient solids with reference to the amount of water that it can be fed directly to the calcining kiln without putting too great a burden of water evaporation on the kiln.

The operation of a suitable type of wet cyclonic separator is illustrated diagrammatically in Fig. 2 and such type of separators is described and illustrated more completely in the article referred to above.

In Fig. 2 the separator has a cylindrically shaped inlet chamber 10 into which the slurry is pumped under pressure through a tangential feed inlet 11 which discharges the slurry adjacent the outer wall of the inlet chamber 10 where the slurry containing the various particle size solids in liquid suspension circulates at high speed around the walls of the chamber 10 so as to effect a partial separation of the heavier solid particles from the lighter solid particles in suspension by centrifugal force. The heavier particles, indicated by the larger dots of Fig. 2, are thrown to the outside of the separator and flow in a vortical path downward along the conical sides 12 of the separator to an apex 13, the size of which can be controlled by adjustable valves or by the use of various size openings. Through the apex 13 a thick slurry containing mainly the larger size particles and a comparatively small amount of water or other carrying liquid is discharged. The finer size particles, having the lighter weight, stay to the inside of the separator and flow in a vortical path toward the center of the separator where they are entrained in a flow of liquid passing upward through a vortex finder passage 14 into the overflow chamber 15 from which they flow out through outlet 16. Different size vortex finders 14 may be used and by controlling the size of the opening of apex 13, the size of the vortex finder 14, the rate of flow of material into the separator and the amount of slurry discharged through the outlet 16, it is possible to divide the materials discharged from the separator into a coarse and a fine particle size fraction having different ratios of fine and coarse particles in each fraction.

Substantially the same type and degree of separation can be gotten by passing the slurry over suitably sized screens so as to divide the slurry into various particle size fractions but the screen separation is costly due to the low capacity of the equipment and to mechanical difficulties such as blinding of the fine screens needed to make the separation, whereas a wet cyclonic separator operates continuously at low cost and once the desired operating conditions are established, it will discharge substantially uniform coarse and fine fractions day after day.

In operating according to our process, using the normal sludge of hydrated magnesia produced by the precipitation of magnesium hydroxide from bittern by the use of dolomitic lime in accordance with the process of the said Mastin patent, No. 2,124,002, and with approximately 40% of the sludge being separated as a coarse fraction, we have secured the following typical results:

TABLE 1

*Lime and silica content of whole sludge A as compared with coarse particle size fraction B and fine particle size fraction C produced by wet cyclonic separation*

| Run No. | Percent CaO | | | Percent SiO₂ | | |
|---|---|---|---|---|---|---|
| | A | B | C | A | B | C |
| 1 | 1.17 | 1.53 | 0.93 | 1.55 | 2.08 | 1.20 |
| 2 | 1.08 | 1.60 | 0.73 | 1.41 | 1.92 | 1.07 |
| 3 | 1.20 | 2.02 | 0.65 | 1.35 | 2.07 | 0.87 |
| 4 | 1.69 | 3.16 | 0.71 | 1.57 | 2.25 | 1.12 |
| 5 | 1.38 | 1.77 | 1.12 | 1.59 | 2.24 | 1.16 |
| 6 | 1.39 | 2.23 | 0.83 | 1.59 | 2.33 | 1.10 |
| 7 | 1.21 | 1.88 | 0.76 | 1.22 | 1.60 | 0.97 |
| 8 | 1.08 | 1.47 | 0.82 | 1.28 | 1.63 | 1.05 |
| 9 | 1.22 | 1.90 | 0.77 | 1.36 | 1.90 | 1.00 |
| 10 | 0.96 | 1.53 | 0.58 | 1.59 | 2.49 | 0.99 |
| 11 | 1.20 | 2.18 | 0.55 | 1.63 | 2.50 | 1.05 |
| 12 | 1.27 | 2.23 | 0.63 | 1.76 | 2.48 | 1.28 |
| Average | 1.24 | 1.96 | 0.76 | 1.49 | 2.12 | 1.07 |

This shows an average reduction in the lime content of the fine fraction of 38.8% and an average reduction in the silica content of the fine fraction of 28.1% and an average increase in the lime content of the coarse fraction of 58.2% and an average increase in the silica content of the coarse fraction of 42.4%. A total of sixty-five daily plant runs showed an average reduction in the lime content of the fine fraction of 34.4% and an average reduction in the silica content of the fine fraction of 22.2%.

When operating with shaking screens set to nominally produce +60 mesh and −200 mesh fractions, we were able to produce the following fractions although our separation was imperfect:

| Whole Sludge A | | | Course Fraction B | | | Fine Fraction C | | |
|---|---|---|---|---|---|---|---|---|
| Percent +65 | Percent +100 | Percent +325 | Percent +65 | Percent +100 | Percent +325 | Percent +65 | Percent +100 | Percent +325 |
| 19.1 | 30.4 | 75.6 | 65.9 | 74.1 | 83.3 | | | 9.9 |

When operating with vibrating screens set to nominally produce +50 mesh and −100 mesh fractions, we were able to produce the following fractions:

| Whole Sludge A | | | Coarse Fraction B | | | Fine Fraction C | | |
|---|---|---|---|---|---|---|---|---|
| Percent +65 | Percent +100 | Percent +325 | Percent +65 | Percent +100 | Percent +325 | Percent +65 | Percent +100 | Percent +325 |
| 15.3 | 23.5 | 62.9 | 48.4 | 67.2 | 88.8 | 0 | 2.1 | 38.6 |

When operating with a wet cyclonic separator, we were able to produce the following fractions:

| Whole Sludge A | | | Coarse Fraction B | | | Fine Fraction C | | |
|---|---|---|---|---|---|---|---|---|
| Percent +65 | Percent +100 | Percent +325 | Percent +65 | Percent +100 | Percent +325 | Percent +65 | Percent +100 | Percent +325 |
| 13.4 | 24.1 | 57.3 | 38.2 | 52.6 | 84.9 | 0 | 8.8 | 42.4 |

In one test the whole sludge used in the wet cyclonic separator contained 1.04% CaO and 1.33% $SiO_2$. The coarse fraction from the separator contained 2.22% CaO and 2.43% $SiO_2$ and the fine fraction contained 0.70% CaO and 1.08% $SiO_2$.

The above results may be considered as typical for showing the general particle size classification in the various fractions and the concentration of the CaO and $SiO_2$ impurities in the coarse fraction with consequent reduction of its total MgO content and likewise the reduction of the CaO and $SiO_2$ impurities in the fine fraction with consequent increase in its total MgO content.

The following are typical performance data for the wet cyclonic separator although it will be understood that the controls may be readily changed to produce different degrees of separation into fine and coarse fractions.

very high density, resembling wet filter cake in consistency.

When operating with a wet cyclonic separator the following are typical examples of the concentration by weight percentage of larger particle size material in the coarse fraction and the smaller particle size material in the fine fraction.

TABLE 3

| Run No. | Whole Sludge A | | | Coarse Fraction B | | | Fine Fraction C | | |
|---|---|---|---|---|---|---|---|---|
| | Percent +65 Mesh | Percent +100 Mesh | Percent +325 Mesh | Percent +65 Mesh | Percent +100 Mesh | Percent +325 Mesh | Percent +65 Mesh | Percent +100 Mesh | Percent +325 Mesh |
| 1 | 13.8 | 23.1 | 54.2 | 29.2 | 43.7 | 76.9 | 5.5 | 12.0 | 42.1 |
| 2 | 13.3 | 23.6 | 63.4 | 29.6 | 48.5 | 75.8 | 4.5 | 10.3 | 56.7 |
| 3 | 12.8 | 22.9 | 60.6 | 57.3 | 65.2 | 88.8 | 0 | 0.2 | 45.4 |
| 4 | 14.0 | 24.8 | 64.7 | 46.6 | 61.9 | 96.5 | 0 | 4.8 | 47.6 |
| 5 | 15.0 | 23.9 | 59.4 | 40.5 | 54.7 | 93.5 | 1.2 | 7.2 | 41.1 |
| 6 | 10.1 | 17.5 | 52.7 | 26.9 | 43.6 | 67.1 | 1.1 | 3.5 | 45.0 |
| 7 | 10.2 | 16.6 | 49.2 | 27.6 | 44.4 | 78.3 | 0.9 | 1.7 | 33.6 |
| 8 | 11.0 | 20.6 | 54.9 | 18.5 | 28.9 | 65.6 | 6.9 | 16.2 | 49.1 |
| 9 | 15.0 | 25.0 | 56.0 | 39.9 | 61.5 | 98.5 | 1.5 | 5.4 | 33.2 |
| 10 | 16.3 | 23.3 | 56.4 | 47.8 | 65.9 | 97.0 | 0 | 0.5 | 34.5 |
| 11 | 15.5 | 23.5 | 58.3 | 46.7 | 60.7 | 96.3 | 0 | 3.4 | 37.9 |
| Average 11 runs | 13.4 | 22.2 | 57.3 | 38.2 | 52.6 | 84.9 | 2.0 | 5.9 | 42.4 |

When the coarse and fine fractions were calcined to produce oxychloride grade MgO and mixed and tested according to the standards specified by the Oxychloride Cement Association (OCA), the following results were secured. The gauging solution was standard magnesium chloride of 22° Be. strength.

TABLE 4

| | Gauging Ratio, ml./g., MgO | Flow, percent | Setting Time, min. | | Contraction, percent | | Transverse Strength, p. s. i. | | | |
|---|---|---|---|---|---|---|---|---|---|---|
| | | | Init. | Final | Gross | NPC | 1 Day | 3 Days | 7 Days | 28 Days |
| Screen Separated +60 −200 Mesh: | | | | | | | | | | |
| Whole Sludge A | 1.77 | 107.6 | 110 | 177 | −.560 | −.252 | 1,220 | 1,200 | 1,330 | 1,280 |
| Coarse Frac. B | 1.50 | 104.0 | 120 | 194 | −.372 | −.138 | 1,490 | 1,600 | 2,140 | 1,730 |
| Fine Frac. C | 1.80 | 98.9 | 112 | 194 | −.922 | −.448 | 1,160 | 1,290 | 1,360 | 1,110 |
| Screen Separated +50 −100 Mesh: | | | | | | | | | | |
| Whole Sludge A | 1.60 | 102.8 | 123 | 191 | −.539 | −.203 | 1,460 | 1,640 | 1,590 | 1,640 |
| Coarse Frac. B | 1.35 | 100.8 | 109 | 163 | −.150 | 0.0 | 1,620 | | 2,490 | 2,770 |
| Fine Frac. C | 1.70 | 103.8 | 110 | 170 | −.690 | −.379 | 1,280 | 1,420 | 1,530 | 1,520 |
| Wet Cyclone Separated: | | | | | | | | | | |
| Whole Sludge A | 1.65 | 105.1 | 140 | 234 | −.537 | −.166 | 1,170 | | 1,520 | 1,480 |
| Coarse Frac. B | 1.45 | 103.1 | 164 | 265 | −.459 | −.092 | 1,370 | 2,220 | 2,340 | 2,340 |
| Whole Sludge A | 1.65 | | 162 | 236 | −.740 | −.327 | 1,340 | 1,810 | 1,930 | 2,010 |
| Coarse Frac. B | 1.40 | 105.4 | 184 | 265 | −.516 | −.183 | 1,350 | 2,250 | 2,330 | 3,090 |

In the above table NPC designates the nonplastic contraction when measured by the standards specified by the Oxychloride Cement Association.

The comparison between the oxychloride grade magnesia made from the coarse particle size fraction and that made from whole sludge and from calcinated magnesite is as follows:

TABLE 2

| Test No. | Feed | | | | Fines | | | Coarse | | |
|---|---|---|---|---|---|---|---|---|---|---|
| | Pressure, p.s.i. | Density, lb./MgO, gal. | Rate, G.P.M. | +200 Mesh, percent | Density, lb./MgO, gal. | Rate, G.P.M. | +200 Mesh, percent | Density, lb./MgO, gal. | Rate, G.P.M. | +200 Mesh, percent |
| 23 | 17 | 2.41 | 45.3 | 48.1 | 2.18 | 40.8 | 38.1 | 4.50 | 4.5 | 81.3 |
| 24 | 20 | 2.41 | 46.1 | 48.1 | 2.04 | 38.1 | 35.3 | 4.17 | 8.0 | 79.2 |
| 25 | 34 | 2.41 | 62.5 | 48.1 | 2.01 | 50.7 | 25.0 | 4.13 | 11.8 | 79.9 |

These tests were run in a six inch diameter separator with a small adjustable apex having a maximum diameter of ⅞" and a 1½" vortex finder. The coarse fractions were

TABLE 5

|  | Oxychloride Grade MgO | | |
|---|---|---|---|
|  | MgO from from Magnesite | MgO from Whole Sludge A | MgO from Coarse Fraction B |
| Bulk Densities, lb./cu. ft. | 70–80 | 30–40 | 35–45. |
| OCA 7-day Strength, p.s.i.: | | | |
| Range | 2,000–2,800 | 1,500–2,100 | 2,100–2,500. |
| Typical | 2,300 | 1,850 | 2,300. |
| Gauging Ratio, ml./g | 1.0–1.05 | 1.45–1.55 | 1.3–1.4. |
| Nonplastic Contraction, OCA. | 0.1% | greater than 0.2%. | less than 0.2%. |

When the coarse fraction is calcined to produce periclase and other types of commercial refractories, the concentration of lime and silica therein helps to provide the fluxing agent which would otherwise have to be added when such refractories are made from sea water or bittern magnesium hydroxide. When calcined and milled under similar conditions, the coarse fraction usually shows a higher bulk density than the whole sludge and the fine fraction shows a lower bulk density than the whole sludge as is shown by the following table.

The tests reported in Table 5 were made on normal commercial products. The products tested in the following Table 6 were produced by laboratory calcination which accounts for the differences in bulk densities shown.

TABLE 6

| Sample | Calcining Temp. (°C.) | I₂ No. | Ign. Loss (percent) | +200 Mesh (percent) | Bulk Density (lb./cu. ft.) |
|---|---|---|---|---|---|
| Whole Sludge A | 520 | 30.0 | 7.48 | 11.6 | 23.8 |
|  | 845 | 7.3 | 0.96 | 10.5 | 25.0 |
|  | 1,005 | 2.8 | 0.13 | 15.0 | 28.7 |
| Coarse Fraction B | 495 | 33.1 | 3.20 | 14.2 | 29.0 |
|  | 860 | 9.3 | 0.59 | 17.4 | 28.7 |
|  | 1,000 | 5.4 | 0.34 | 12.3 | 26.0 |
|  | 640 | 21.3 | 2.20 | 2.1 | 19.8 |
| Fine Fraction C | 820 | 11.0 | 1.34 | 4.7 | 19.5 |
|  | 1,010 | 4.1 | 0.50 | 7.0 | 21.9 |

The iodine absorption number and the ignition loss of the fine fraction tends to be higher than the coarse fraction but test results vary with varying conditions.

When the fine fraction is calcined to produce refractory or chemical grades of MgO, a product having a smaller amount of CaO and SiO₂ and a larger amount of total MgO results. Such high purity MgO products are particularly useful in high temperature refractories, high temperature insulating materials and in many chemical processes where high purity magnesia is needed.

While we have described a preferred method of practicing our process and preferred types of products, it will be understood that various modifications may be made in the practice of the process and the type of products produced from those specifically described herein without departing from the spirit of our invention or the scope of the following claims.

We claim:
1. The method of producing magnesia products from magnesium hydroxide sludge precipitated from a solution containing a soluble magnesium halide by the use of lime and concentrated by settling which comprises separating the whole of the precipitated magnesium hydroxide sludge into a fine fraction consisting of about 60 to 70% of magnesium hydroxide content of the whole sludge, said fine fraction containing at least 30% less CaO and at least 20% less SiO₂ than the original whole sludge, and a coarse fraction consisting of about 30 to 40% of the magnesium hydroxide content of the whole sludge, said coarse fraction containing at least 40% more CaO and at least 30% more SiO₂ than the original whole sludge, and separately calcining the two fractions to produce two distinct grades of magnesia each different from that obtainable by calcining the sludge as a whole.

2. The method of producing magnesia products from magnesium hydroxide sludge precipitated from bittern by the use of lime which comprises separating the whole of the precipitated magnesium hydroxide sludge into a fine fraction containing about 60% of the magnesium hydroxide content of the whole sludge and a coarse fraction containing about 40% of the magnesium hydroxide content of the whole sludge, said fine fraction containing at least 30% less CaO and at least 20% less SiO₂ than the original whole sludge, and said coarse fraction containing at least 40% more CaO and at least 30% more SiO₂ than the original whole sludge, and separately calcining the two fractions to produce two distinct grades of magnesia each different from that obtainable by calcining the sludge as a whole.

3. The method of producing magnesia products from magnesium hydroxide sludge precipitated from bittern by the use of lime and concentrated by settling which comprises separating the whole of the precipitated magnesium hydroxide sludge containing normally from about 1 to 2% of CaO and from about 1 to 2% of SiO₂ into a fine mesh fraction consisting of at least 60% of the magnesium hydroxide content of the whole sludge, said fine fraction containing about 38% less CaO and about 28% less SiO₂ than the original whole sludge, and a coarse fraction consisting of at least 30% of the magnesium hydroxide content of the whole sludge, said coarse fraction containing about 58% more CaO and about 42% more SiO₂ than the original whole sludge, and separately calcining the two fractions to produce two distinct grades of magnesia each different from that obtainable by calcining the sludge as a whole.

4. The method of producing magnesia from magnesium hydroxide sludge precipitated from bittern by the use of lime which comprises separating the whole sludge containing an average of more than 20% by weight of plus 100 mesh particles into a fine fraction containing an average of less than 10% by weight of plus 100 mesh particles and a coarse fraction containing an average of more than 40% by weight of plus 100 mesh particles, said fine fraction containing at least 30% less CaO and at least 20% less SiO₂ than the original whole sludge and said coarse fraction containing at least 40% more CaO and at least 30% more SiO₂ than the original whole sludge, and separately calcining the two fractions to produce two distinct grades of magnesia, each different from that obtainable by calcining the sludge as a whole.

5. The method of producing magnesia products from magnesium hydroxide sludge precipitated from bittern by the use of lime which comprises separating the whole of the precipitated magnesium hydroxide sludge into a fine fraction containing less than 50% by weight of the percentage of plus 100 mesh particles contained in the whole sludge and a coarse fraction containing more than 150% of plus 100 mesh particles contained in the whole sludge, said fine fraction containing at least 30% less CaO and at least 20% less SiO₂ than the original whole sludge, and said coarse fraction containing at least 40% more CaO and at least 30% more SiO₂ than the original whole sludge, said fine and said coarse fractions together containing all of the magnesium hydroxide content of the whole sludge, and separately calcining the two fractions to produce two distinct grades of magnesia each different from that obtainable by calcining the sludge as a whole.

References Cited in the file of this patent

UNITED STATES PATENTS

| 2,089,339 | Chesny | Aug. 10, 1937 |
| 2,281,477 | Chesny | Apr. 28, 1942 |
| 2,348,847 | Pike | May 16, 1944 |
| 2,447,412 | Heuer | Aug. 17, 1948 |
| 2,479,138 | Scoles | Aug. 16, 1949 |
| 2,493,752 | De Maestri | Jan. 10, 1950 |